(12) United States Patent
Shuster

(10) Patent No.: US 8,594,084 B2
(45) Date of Patent: Nov. 26, 2013

(54) NETWORK ROUTER SECURITY METHOD

(75) Inventor: Gary Stephen Shuster, Fresno, CA (US)

(73) Assignee: Intellectual Ventures I LLC, Wilmington, DE (US)

( * ) Notice: Subject to any disclaimer, the term of this patent is extended or adjusted under 35 U.S.C. 154(b) by 914 days.

(21) Appl. No.: 11/530,725

(22) Filed: Sep. 11, 2006

(65) Prior Publication Data

US 2007/0076711 A1 Apr. 5, 2007

Related U.S. Application Data

(60) Provisional application No. 60/715,849, filed on Sep. 9, 2005.

(51) Int. Cl.
*H04L 12/28* (2006.01)

(52) U.S. Cl.
USPC .......................................... 370/389; 710/316

(58) Field of Classification Search
USPC ......... 370/294, 389, 401; 200/305; 726/12, 4; 713/201; 717/177; 709/225
See application file for complete search history.

(56) References Cited

U.S. PATENT DOCUMENTS

| | | | | |
|---|---|---|---|---|
| 5,626,222 A | * | 5/1997 | Aguilera | 200/305 |
| 5,825,775 A | * | 10/1998 | Chin et al. | 370/401 |
| 5,999,536 A | * | 12/1999 | Kawafuji et al. | 370/401 |
| 6,108,314 A | * | 8/2000 | Jones et al. | 370/294 |
| 6,115,376 A | | 9/2000 | Sherer | |
| 2002/0083337 A1 | * | 6/2002 | Welcher et al. | 713/201 |
| 2005/0054326 A1 | | 3/2005 | Rogers | |
| 2005/0055570 A1 | * | 3/2005 | Kwan et al. | 713/201 |
| 2006/0041937 A1 | * | 2/2006 | Chandley et al. | 726/12 |
| 2006/0089987 A1 | * | 4/2006 | Igarashi et al. | 709/225 |
| 2006/0236376 A1 | * | 10/2006 | Liu et al. | 726/4 |
| 2006/0248229 A1 | * | 11/2006 | Saunderson et al. | 709/245 |
| 2006/0253852 A1 | * | 11/2006 | Honda et al. | 717/177 |

FOREIGN PATENT DOCUMENTS

| | | |
|---|---|---|
| EP | 1 411 674 A1 | 4/2004 |
| JP | 4-60447 | 2/1992 |
| JP | 2001-086231 | 3/2001 |
| JP | 2002-159053 | 5/2002 |
| JP | 2003-338821 | 11/2003 |
| JP | 2004-215232 | 7/2004 |
| JP | 2004-320162 | 11/2004 |
| JP | 2005-079975 | 3/2005 |

OTHER PUBLICATIONS

European Office Action dated Jul. 23, 2008, Re: Application No. 06 803 311.7-2416 (3 pages).
International Search Report and Written Opinion, PCT/US/2006/035245 Dated Mar. 20, 2008.

(Continued)

*Primary Examiner* — Dang Ton
*Assistant Examiner* — Lionel Preval

(57) ABSTRACT

A local network is secured using a router or hub that includes a security switch. During or immediately after initial network configuration, the router or hub records MAC addresses of connected network devices. After initial configuration is completed, the switch is activated. After the switch is activated, the router or hub will not allow connection of additional devices, as determined by the MAC addresses of connected devices. The security switch can be deactivated to permit connection of additional devices.

17 Claims, 1 Drawing Sheet

(56) References Cited

OTHER PUBLICATIONS

AVM:"WLAN:WLAN MAC—Adressen der FRITZIBox verwalte", Jan. 2, 2005, www.avm de/de/Service/Service-Portale/Service-Portal/Praxis_und_Tipps/52_wlan_mac_addressen.php?portal=FRITZIBox_SL-WLAN [retrieved on Jan. 23, 2007] (pp. 1-2).

FRITZIBox Fon WLAN "Diskussion nur zum Funknetzwerk. DynDNS + MAC Filter & OSQ + Ports" Jan. 2, 2005 wwip-phone-forum de/archive/index pho/t-6771 [Retrieved on Jan. 23, 2007 (pp. 1-3).

Written Opinion of the International Searching Authority for corresponding application No. EP 06 803 311.7-2416, Sep. 2, 2009.

Office Action dated Aug. 10, 2010 for corresponding JP Application No. 2008-530011.

* cited by examiner

NETWORK ROUTER SECURITY METHOD

CROSS-REFERENCE TO RELATED APPLICATION

This application claims priority pursuant to 35 U.S.C. §119 (e) to U.S. provisional application Ser. No. 60/715,849, filed Sep. 9, 2005, which application is specifically incorporated herein, in its entirety, by reference.

BACKGROUND OF THE INVENTION

1. Field of the Invention

The present invention relates to a method for securing access to a network resource, such as to a router, switch, or hub.

2. Description of Related Art

Various network resources, such as switches, routers, and hubs, are used to manage traffic flow over local area networks and wide area networks. Network security can be compromised when an unauthorized device is allowed to connect to a network traffic-handling resource of this type. Conversely, security may be improved if authorized devices only are permitted to connect. With the proliferation of wireless routers and hubs, such resources are increasingly vulnerable to unauthorized connections being established without the knowledge of the network operator.

Various methods may be used to secure network traffic-handling resources. One option is to restrict the "MAC" Ethernet addresses which are permitted to access the network. However, setting up this security method on a network device requires locating and typing in complex and easily transposed strings of digits. Other security methods for wireless and wired networks may also be difficult for end users to set up. While configuration of security devices may not pose challenges for sophisticated networks users, it may be beyond the skill level of many less sophisticated users, such as operators of home or small business networks. Therefore, many local networks may remain vulnerable to unauthorized entry, particularly via a wireless connection.

It is desirable, therefore, to provide a system and method for securing a network resource such as a switch, router, or hub, that overcomes the limitations of the prior art.

SUMMARY OF THE INVENTION

The invention provides a system and method for securing a network resource such as a switch, router, or hub, that prevents unauthorized connections to the resource, while remaining convenient for unsophisticated users to configure. The invention takes advantage of the fact that a new network, even a wireless one, typically takes some period of time before being "discovered" by hackers. As a result, there is a window of time during which only legitimate devices are likely to be accessing it. At the same time, by counting and reporting the number of accessing devices, the routing device presents data to the router's owner that permits him to determine whether there are too many devices accessing the system (and therefore likely a hacker in the midst).

This invention permits a switch, router, hub or other routing device to be secured by as little as a single action, such as by a single mouseclick or by the push of a single button. The single action may be performed using an actuator located on the routing device, or using a remote actuator, such as a mouse, keyboard, microphone, or other input device of a remotely-located computer.

To configure security for a routing device, the user first connects the devices that will be authorized for connecting to the routing device, using any suitable wired or wireless connection, such as an Ethernet connection. The router optionally provides a display output via a secured connection that indicates the number of devices it detects attached to it. This connection may be secured as known in the art, such as by using a password or encryption. Optionally, additional information about these devices is displayed, such as MAC address, length of time connected, and so forth. The user confirms that the right number of devices or other data are correct, and activates a "secure the system" actuator on the router or remote computer. The routing device then records all device MAC addresses that are then attached to the system as exclusively authorized devices.

Subsequently, the routing device refuses communications with any new devices that have not been identified as authorized devices. Authorized devices may be detached and reattached, and will function seamlessly as long as the MAC address remains the same. At the same time, a hacker trying to access the network, or example, somebody driving by with a wireless network card trying to find unsecured networks, would be unable to access the device as his computer would be transmitting an unauthorized MAC address.

To facilitate temporarily providing access to a new device, the router may be provided with an "unsecure" button or function to stop blocking new MAC addresses. Access to activation of such a function, if present, should be adequately secured. To facilitate reconfiguration of the authorized network devices, the router may be adapted for addition of new devices, either manually or by re-pressing the "secure" button.

The device can also have the ability to temporarily or permanently delete MAC addresses from its access list, therefore permitting an administrator to temporarily disable various MAC addresses. This may be useful, for example, for testing authorized equipment to see if it still has access, or for identifying and disabling MAC addresses that are no longer in use by authorized network devices.

A more complete understanding of the system and method for securing a network address will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The invention provides a novel system and method for securing a network routing device, that overcomes the limitations of the prior art.

Figure 1:
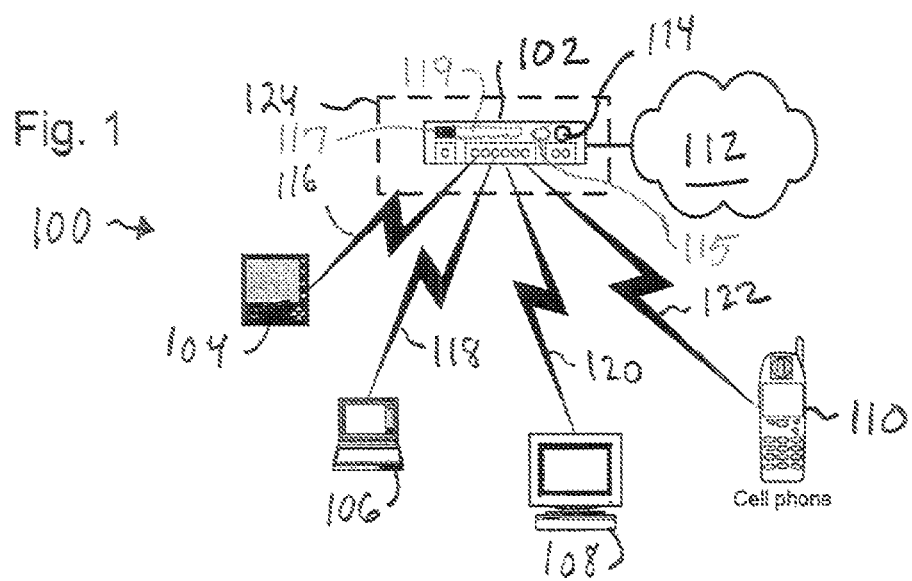
FIG. 1 is a schematic diagram of a local area network using a security system and method according to the invention.

FIG. 1 shows a system 100 comprising a routing device 102, such as a switch, hub, or router, having ports for connecting to various network devices 104, 106, 108, and 110. Routing device 102 may further by connected to a wide area network 112, such as the Internet. Routing device 102 may comprise a security feature, such as a mechanical actuator 114, here depicted as a button, although it may be provided in any suitable form. If desired a second mechanical actuator 115 may be provided. The mechanical actuators may be operatively associated with software for executing a security method according to the invention, via a processor, non-volatile memory 117, and other circuit elements 119 as known in the art. In the alternative, or in addition, routing device 102 may comprise security software adapted to receive instructions from a connected device, such as computer 106. Communication links 116, 118, 120 and 122 may comprise any suitable wired or wireless connection as known in the art, for example, an Ethernet connection, that makes use of an identifier for each connected device.

The security actuator, e.g., button 114 or computer 106, should be placed in a secure location 124. For example, if the actuator comprises a button 114 located on the routing device for a home network, the routing device may be kept in a private area 124 of the home. If a remote administrative computer 106 or other device is used to activate the security method, it likewise should be placed in the secure area during system configuration. For small business and home networks, locating the routing device 102 or any administrative computer 106 inside the home or office should provide adequate security for most users. If an administrative computer or other remote device is used to activate the security features of routing device 102, then a password or other method of securing access to the security functions of router 102 may be used.

Devices 104, 106, 108, 110 may comprise any device with a suitable network adaptor or circuitry for connecting to routing device 102. Ethernet device interfaces, as known in the art, each comprise a unique Media Access Control ("MAC") address that is written into non-volatile memory at the time of manufacture. MAC addresses uniquely identify each node in a network at the Media Access Control layer, which is the lowest network layer. In modern Ethernets, the MAC address consists of six bytes which are usually displayed in hexadecimal; e.g., 00-0A-CC-32-FO-FD. Other network protocols may use similar identifiers at low network layers, and may therefore be suitable for, or may be adapted for use with the invention.

To configure routing device 102 for secure operation, a user first connects all of the devices to be given access to the network. In embodiments of the invention, this may be done via a wireless connection, such as by powering up all wireless-enabled devices in the vicinity of router 102. In the alternative, or in addition, a cable may be connected between a network device and a network port of routing device 102. During an initialization routine performed when first installing the routing device 102, or after a re-initialization routine is initiated, the routing device 102 may be configured to connect to and automatically determine the MAC addresses of connected devices. Further details are provided below.

Figure 2:
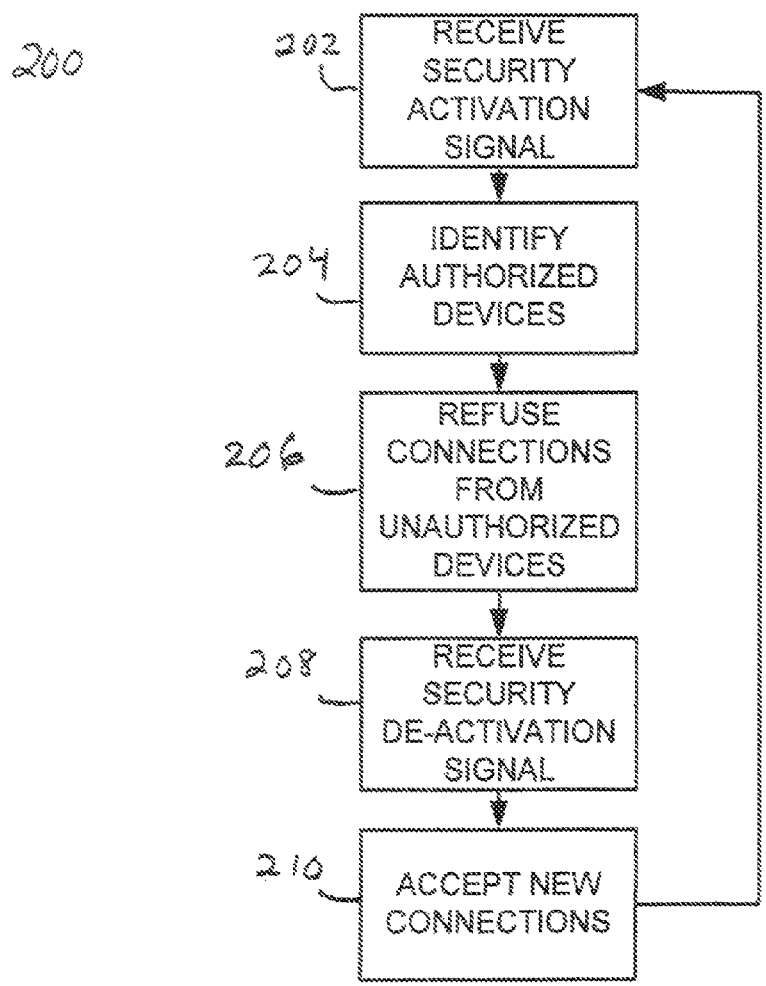
FIG. 2 is a flow chart showing exemplary steps of a method according to the invention.

Routing device 102 may be configured, such as by using suitable software or firmware, to perform a method 200 as shown in FIG. 2 for securing access to network 100. Steps 202-210 may be performed in any operative order. At step 202, the routing device may receive a security activation signal, such as via a button press or from a remotely connected device. At step 204, the routing device may identify and record MAC addresses of all connected devices. These addresses are held in a non-volatile memory of the router and compared against the MAC address of any subsequently-connected device. At step 206, connections to subsequently-connecting devices lacking a matching MAC address are refused. However, devices identified as having an authorized MAC address may be disconnected and reconnected as often as desired.

To add additional network devices, or to remove old devices, the router may be provided with a re-initialization signal or security deactivation signal, as indicated at step 208. Either or both signals may be provided via button 114 or through an administrative terminal operating on any of devices 104-110. For example, pressing security button again may result in a re-initialization process. During re-initialization, router 102 may remove all previously-stored MAC addresses, and collect the MAC addresses of currently connected devices at step 210. For further example, pressing and holding button 114, double-clicking the button, or pressing a second button may temporarily deactivate security for the routing device 102, allowing new connections to be made at step 210. At the user's option, MAC addresses for these new connections may be added to the router's list of authorized devices, or not. Router 102 may also be configured to manually remove, temporarily deactivate or re-activate, and add new MAC addresses, such as via a user interface to a secure administrative computer 106.

It should be apparent that the initial security signal and the re-initialization signal or security deactivation signal can be provided as a binary on/off signal provided to the appropriate location. For example, the signal may be provided by setting the state of a mechanical switch or actuator to "on" or "off." The router may be configured to check the state of one or more input switches at periodic intervals, for example, once per second. Likewise, the security signals may be provided as a binary signal from an authorized administrator connected to the routing device via a secure remote connection. It should be clear, therefore, that the security switching signal according to the invention is distinguished from prior art signals used in signaling routers, which generally require the used of a private user name and secure password. The present invention does not require memorization of user names or passwords, as the security switch may be secured by physical proximity to the router or by securing an administrative computer using any suitable prior art method.

Some network devices, such as broadband routers, can clone a MAC address for a network interface card. Such capability may make the Wide Area Network (WAN) Ethernet interface going to a cable or DSL modem look like a network interface for a previously-connected computer. To prevent a rogue device from cloning the MAC address of an authorized device, the MAC addresses of connected devices should not be available outside of the secure network. Advantageously, the security configuration method of the invention may make it unnecessary to discover or share MAC addresses beyond the level of routing device 102.

Having thus described a preferred embodiment of the system and method for securing a network, it should be apparent to those skilled in the art that certain advantages of the within system have been achieved. It should also be appreciated that various modifications, adaptations, and alternative embodiments thereof may be made within the scope and spirit of the present invention. For example, an Ethernet connection to a network has been illustrated, but it should be apparent that the inventive concepts described above would be equally applicable other network types, for example, a Bluetooth network. The invention is defined by the appended claims.

What is claimed is:

1. A network routing device for connecting to computer network devices, comprising:
    a housing enclosing a circuit configured for connecting a plurality of external network devices to a network;
    a non-volatile memory connected to the circuit; and
    a switch connected to the circuit and configured to switch the circuit between different operational states, a first operational state wherein the circuit is configured to permit connections to all of the plurality of external network devices then connected to the circuit in response to the switch being in the first operational state, to receive MAC addresses for all of the plurality of external network devices then connected to the circuit, and to store the MAC addresses in the non-volatile memory as authorized MAC addresses for all of the plurality of external devices then connected to the circuit in response to the switch being in the first operational state so long as the switch is in the first operational state without further approval, and a second operational state wherein the circuit is configured to only allow connections with external network devices corresponding to the MAC addresses stored in the non-volatile memory when the switch was in the first operational state and to refuse connections to new external network devices not having an authorized MAC address stored in the non-volatile memory.

2. The network routing device of claim 1, wherein the switch comprises a remotely-settable memory location.

3. The network routing device of claim 2, wherein the remotely-settable memory location is in a logic device connected to the circuit.

4. The network routing device of claim 1, wherein the switch comprises an electrical switch.

5. The network routing device of claim 4, wherein the electrical switch comprises a mechanical actuator.

6. The network routing device of claim 5, wherein the mechanical actuator is selected from the group comprising a push-button, a membrane switch, a slide and a rotary actuator.

7. The network routing device of claim 1, wherein the network routing device is configured to operate as a device selected from the group comprising a switch, a router, and a hub.

8. The network routing device of claim 1, wherein the circuit is configured to connect to the plurality of external network devices via a wired connection.

9. The network routing device of claim 1, wherein the circuit is configured to connect to the plurality of external network devices via a wireless connection.

10. A network routing device having a switch, the network routing device configured for connecting a plurality of external network devices to a network and having a non-volatile memory, the network routing device configured to operate in an unsecured mode when the switch is in a first position and in a secured mode when the switch is in a second position, wherein the network routing device is configured to permit connections to all of the plurality of external network devices then connected in response to the network routing device being in the unsecured mode, to receive MAC addresses for all of the plurality of external network devices then connected to the circuit, and to store the MAC addresses in the non-volatile memory as authorized MAC addresses for all of the plurality of external network devices then connected in response to the network routing device being in the unsecured mode so long as the network routing device is configured to operate in the unsecured mode without further approval, and to only allow connections with external network devices corresponding to the MAC addresses stored in the non-volatile memory when the network routing device was in the unsecured mode and to refuse connections to new external network devices not having respective authorized MAC addresses stored in the non-volatile memory when the switch is in the second position.

11. The network routing device of claim 10, further comprising a housing substantially enclosing the network routing device.

12. The network routing device of claim 11, further comprising a first mechanical actuator which comprises the switch on an exterior of the housing, the first mechanical actuator configured to provide external input determining when the network routing device begins operating in the secure mode, in response to actuation by a user.

13. The network routing device of claim 12, wherein the first mechanical actuator is selected from the group comprising a push-button, a membrane switch, a slide and a rotary actuator.

14. The network routing device of claim 12, further comprising a second mechanical actuator on the exterior of the housing, the second mechanical actuator configured to provide external input determining when the network routing device stops operating in the secure mode, in response to actuation by the user.

15. The network routing device of claim 14, wherein the second mechanical actuator is selected from the group comprising a push-button, a membrane switch, a slide and a rotary actuator.

16. The network routing device of claim 10, wherein the network routing device is configured to receive an external input as a signal from an authorized administrator connecting to the network routing device via a secure remote connection.

17. The network routing device of claim 10, wherein the network routing device is configured to operate as a device selected from the group comprising a switch, a router and a hub.

* * * * *

UNITED STATES PATENT AND TRADEMARK OFFICE
CERTIFICATE OF CORRECTION

PATENT NO.        : 8,594,084 B2
APPLICATION NO.   : 11/530725
DATED             : November 26, 2013
INVENTOR(S)       : Shuster Page 1 of 1

It is certified that error appears in the above-identified patent and that said Letters Patent is hereby corrected as shown below:

In the Specification

In Column 2, Line 25, delete "to a new" and insert -- to new --, therefor.

In Column 2, Line 64, delete "by connected" and insert -- be connected --, therefor.

Signed and Sealed this
Sixth Day of May, 2014

Michelle K. Lee
*Deputy Director of the United States Patent and Trademark Office*